United States Patent
Resch

(10) Patent No.: US 10,389,845 B2
(45) Date of Patent: Aug. 20, 2019

(54) DETERMINING HOW TO SERVICE REQUESTS BASED ON SEVERAL INDICATORS

(71) Applicant: International Business Machines Corporation, Armonk, NY (US)

(72) Inventor: Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 15/688,162

(22) Filed: Aug. 28, 2017

(65) Prior Publication Data

US 2017/0359438 A1    Dec. 14, 2017

Related U.S. Application Data

(63) Continuation-in-part of application No. 14/153,319, filed on Jan. 13, 2014, now Pat. No. 9,774,678, which
(Continued)

(51) Int. Cl.
*G06F 15/173* (2006.01)
*H04L 29/08* (2006.01)
(Continued)

(52) U.S. Cl.
CPC .......... *H04L 67/322* (2013.01); *H04L 41/082* (2013.01); *H04L 41/5096* (2013.01);
(Continued)

(58) Field of Classification Search
CPC ............. G06F 12/0246; G06F 12/0804; G06F 12/0866; G06F 12/0638; G06F 13/1694
See application file for complete search history.

(56) References Cited

U.S. PATENT DOCUMENTS 4,092,732 A    5/1978    Ouchi
5,454,101 A    9/1995    Mackay et al.
(Continued)

FOREIGN PATENT DOCUMENTS

WO    WO-2005060203 A1 *    6/2005    ............. H04L 29/06

OTHER PUBLICATIONS

Chung; An Automatic Data Segmentation Method for 3D Measured Data Points; National Taiwan University; pp. 1-8; 1998.
(Continued)

*Primary Examiner* — Dhairya A Patel
(74) *Attorney, Agent, or Firm* — Garlick & Markison; Timothy W. Markison; Bruce E. Stuckman

(57) ABSTRACT

A method for execution by a dispersed storage (DST) processing module includes receiving a data request. An estimated performance level is determined for each of a set of data access approaches, and one data access approach is selected. A data response that includes direction information is issued to the requesting entity when the selected approach includes directing the requesting entity to access an alternate DS processing module. The data object is recovered and a data response is issued to the requesting entity when the selected approach includes accessing the set of DS units directly. A redirect request is issued to the alternate DS processing module when the selected approach includes redirecting the data request, and the alternate DS processing module obtains and issues the data object. A data response is issued to the requesting entity when the alternate DS processing module issues the data object via a redirect response.

18 Claims, 7 Drawing Sheets

Related U.S. Application Data is a continuation-in-part of application No. 12/838,407, filed on Jul. 16, 2010, now Pat. No. 9,015,431.

(60) Provisional application No. 61/769,588, filed on Feb. 26, 2013, provisional application No. 61/256,226, filed on Oct. 29, 2009.

(51) Int. Cl.
*H04L 12/24* (2006.01)
*H04L 12/26* (2006.01)
*H04L 12/859* (2013.01)
*G06F 9/50* (2006.01)

(52) U.S. Cl.
CPC ...... *H04L 67/1008* (2013.01); *H04L 67/1097* (2013.01); *G06F 9/505* (2013.01); *H04L 41/5038* (2013.01); *H04L 43/16* (2013.01); *H04L 47/2475* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,289,462 B1 * | 9/2001 | McNabb ............ G06F 21/6218 726/21 |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,327,141 B2 * | 12/2012 | Vysogorets ............ G06F 21/34 713/168 |
| 8,886,804 B2 * | 11/2014 | Osmond ................ H04N 21/00 709/226 |
| 8,914,480 B1 * | 12/2014 | Jones ....................... H04L 45/00 709/223 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 * | 4/2009 | Gladwin ............ H04L 67/1097 709/203 |
| 2010/0023524 A1 | 1/2010 | Gladwin et al. |
| 2010/0228906 A1 * | 9/2010 | Ramiya Mothilal ....................... G06F 12/0246 711/103 |
| 2010/0268966 A1 | 10/2010 | Leggette et al. |
| 2011/0107036 A1 * | 5/2011 | Resch ................. H04L 12/00 711/154 |
| 2012/0254562 A1 * | 10/2012 | Morrison ................ G06F 13/16 711/155 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

(56) References Cited

OTHER PUBLICATIONS

Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner distributed, or dispersed, storage network (DSN) 10

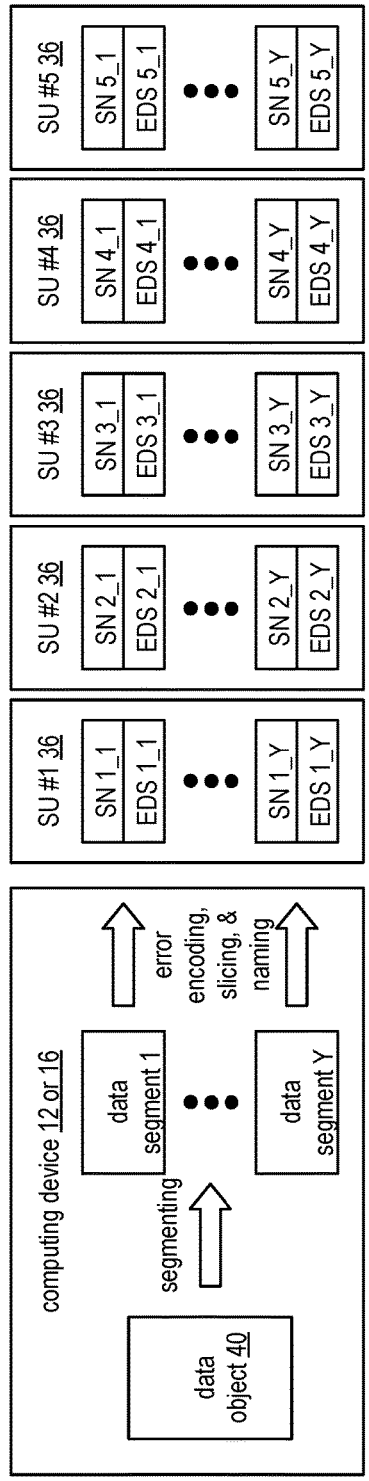
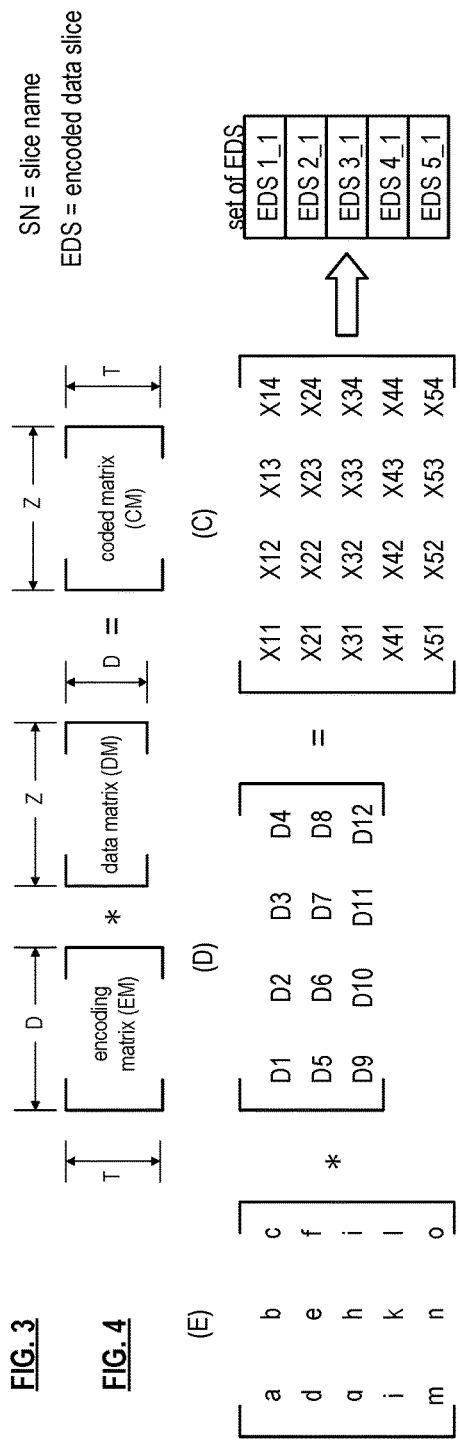

DETERMINING HOW TO SERVICE REQUESTS BASED ON SEVERAL INDICATORS

CROSS-REFERENCE TO RELATED APPLICATIONS

The present U.S. Utility Patent Application claims priority pursuant to 35 U.S.C. § 120 as a continuation-in-part of U.S. Utility Application No. 14/153,319, entitled "TEMPORARILY STORING DATA IN A DISPERSED STORAGE NETWORK", filed Jan. 13, 2014, which claims priority pursuant to 35 U.S.C. § 119(e) to U.S. Provisional Application No. 61/769,588, entitled "CONFIRMING INTEGRITY OF DATA IN A DISPERSED STORAGE NETWORK", filed Feb. 26, 2013, both of which are hereby incorporated herein by reference in their entirety and made part of the present U.S. Utility Patent Application for all purposes.

U.S. Utility Application No. 14/153,319 also claims priority pursuant to 35 U.S.C. § 120 as a continuation-in-part of U.S. Utility Application No. 12/838,407, entitled "DISTRIBUTED STORAGE REVISION ROLLBACKS", filed Jul. 16, 2010, issued as U.S. Pat. No. 9,015,431 on Apr. 21, 2015, which claims priority pursuant to 35 U.S.C. § 119(e) to U.S. Provisional Application No. 61/256,226, entitled "DISTRIBUTED STORAGE NETWORK DATA REVISION CONTROL", filed Oct. 29, 2009, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
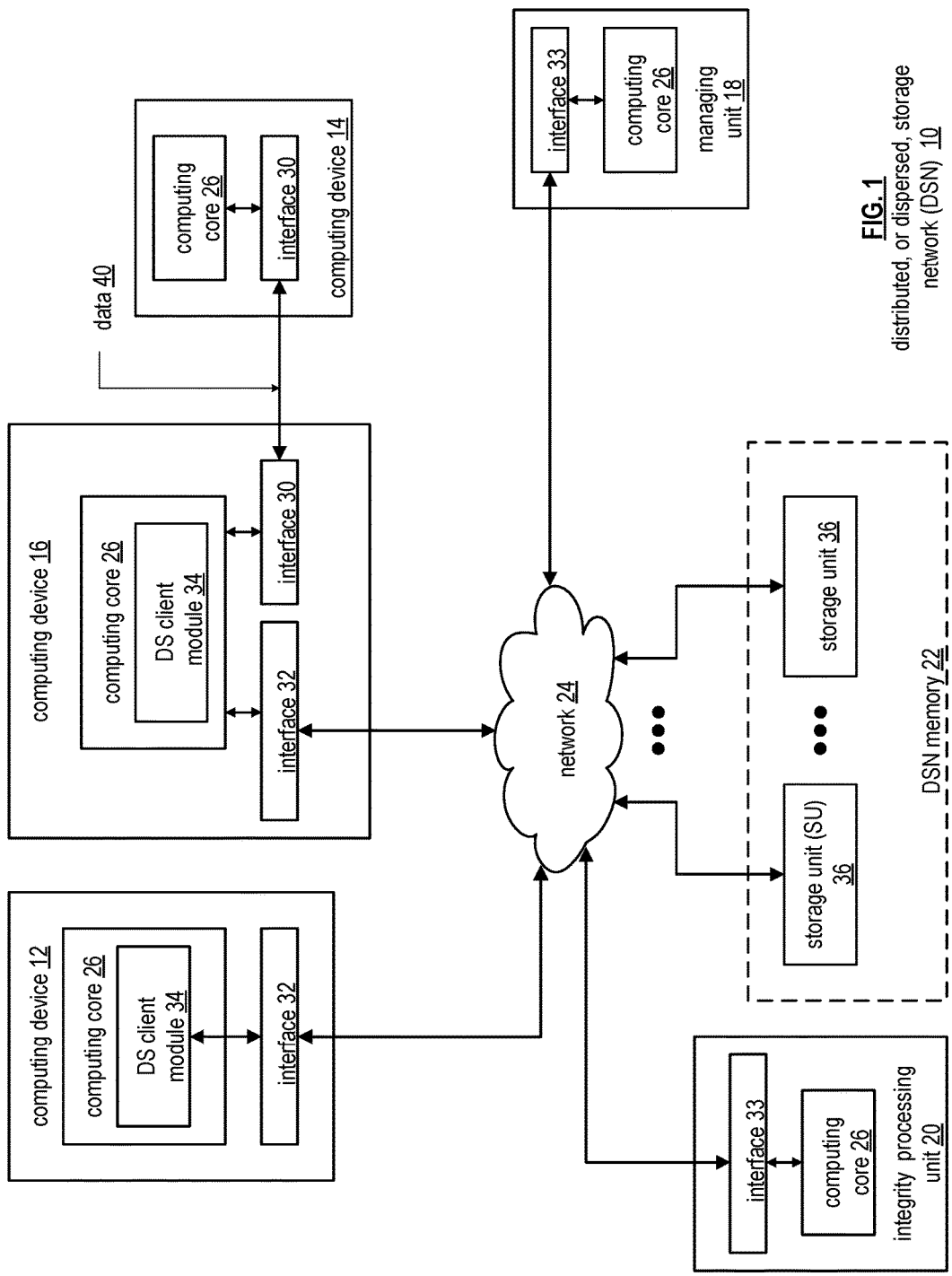
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public interne systems; and/or one or more local area networks (LAN) and/or wide area networks (WAN).

Figure 2:
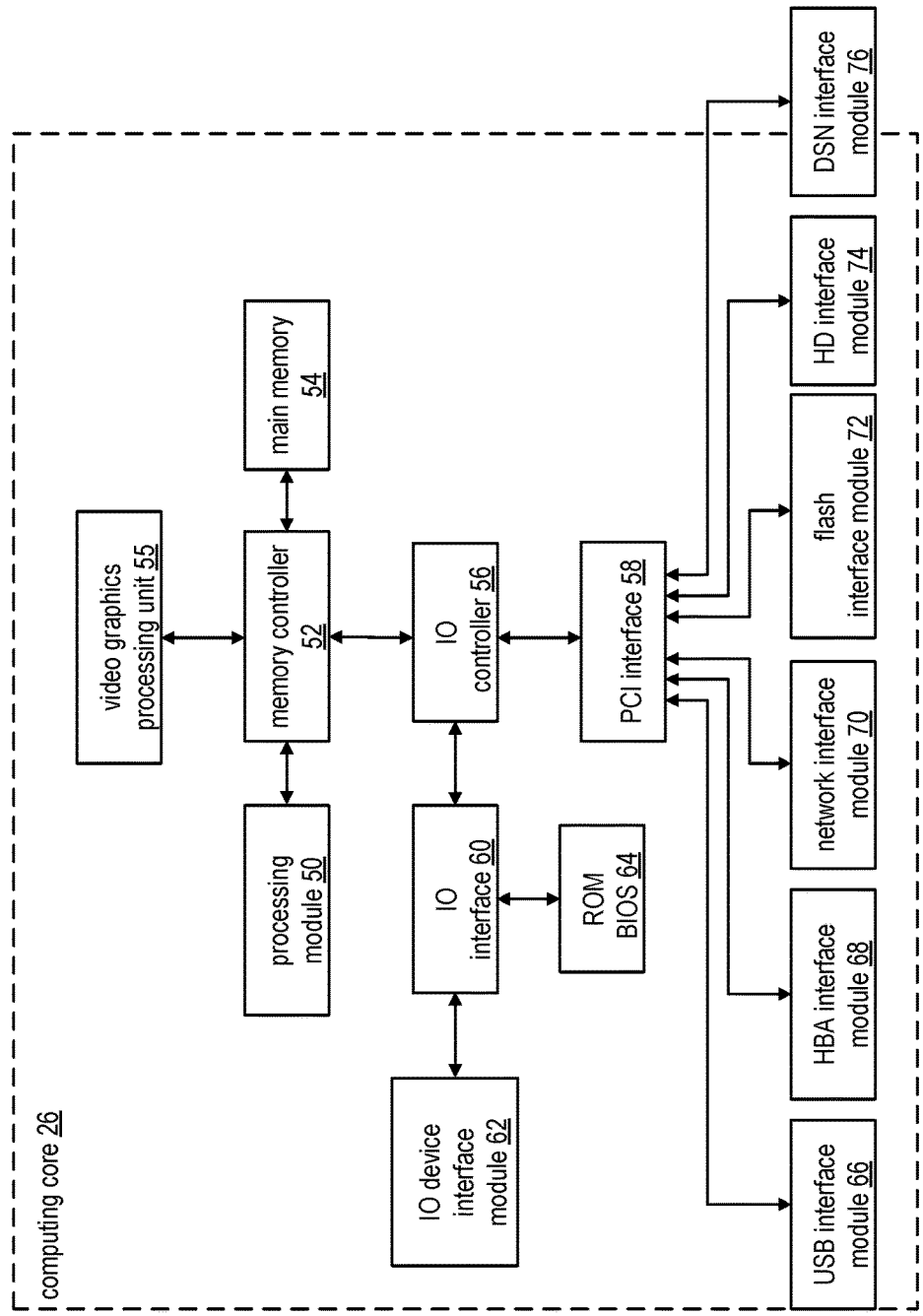
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R)of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
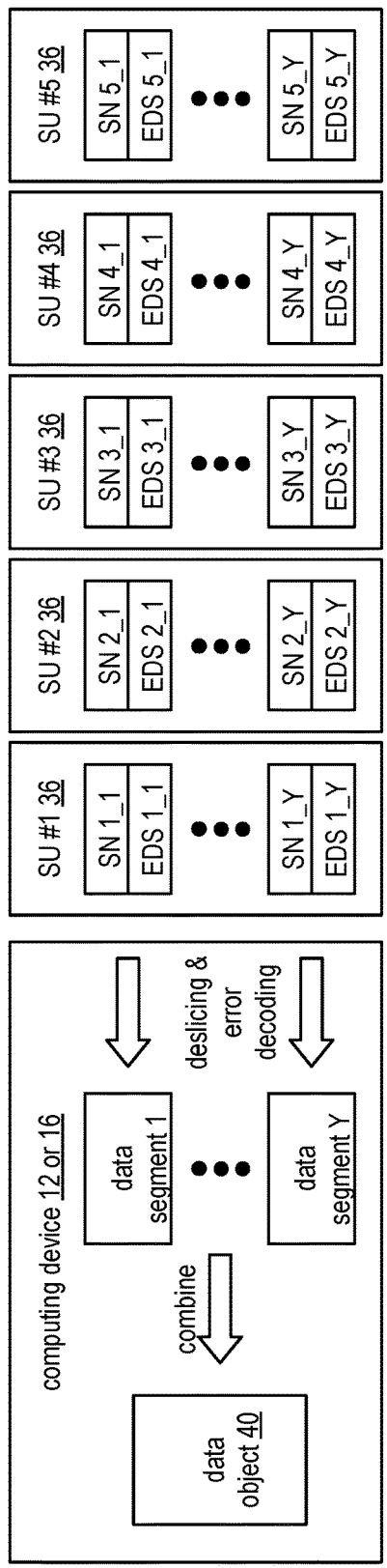
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
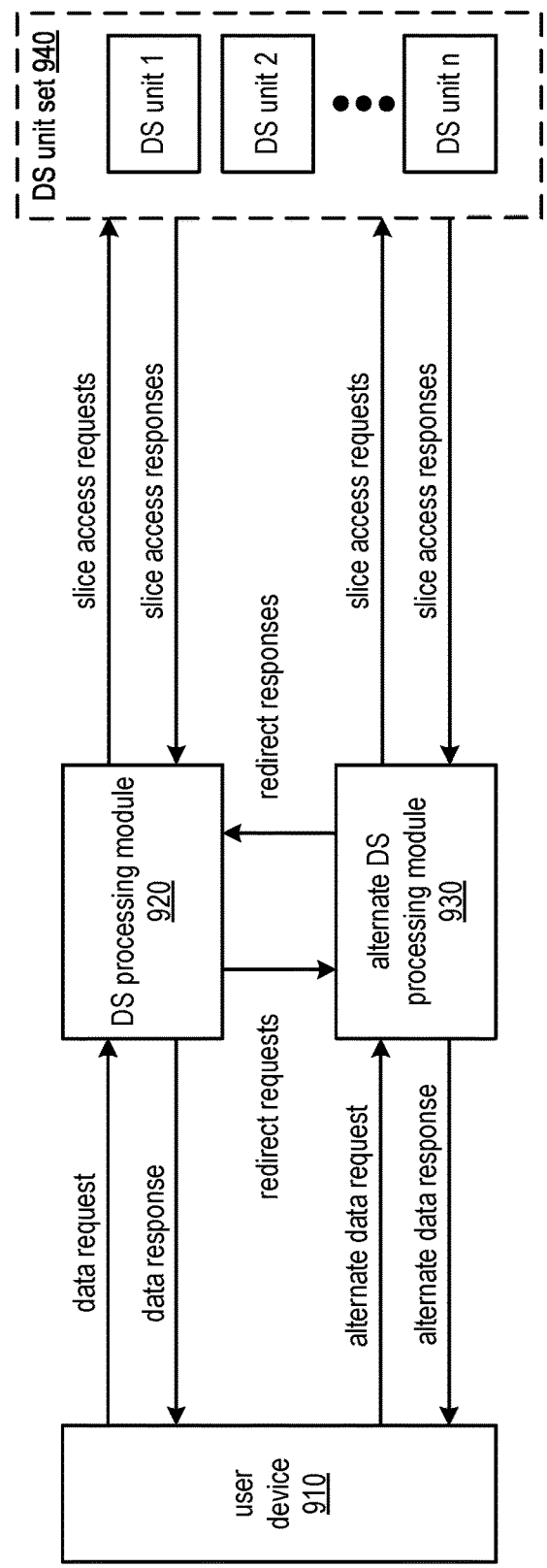
FIG. 9 is a schematic block diagram of an embodiment of a dispersed or distributed storage network (DSN) in accordance with the present invention.

FIG. 9 is a schematic block diagram of another embodiment of a dispersed storage network that includes a user device 910, a dispersed storage (DS) processing module 920, one or more alternate DS processing modules 930, and a DS unit set 940. DS unit set includes a set of DS units 1-n. Each DS unit of the set of DS units may be implemented utilizing one or more of a storage node, a dispersed storage unit, a distributed storage and task (DST) execution unit, a storage server, a storage unit such as storage unit 36 of FIG. 1, a storage module, a memory device, a memory, a user device, a computing device such as computing device 12 or 16 of FIG. 1, a DST processing unit, and a DST processing module. Alternatively, or in addition, at least one of a server, a computer, a DS unit, a user device, a computing device such as computing device 12 or 16 of FIG. 1, or a DST processing unit may be utilized to implement the DS processing module and/or the alternate DS processing module. The DS processing module and/or the alternate DS processing module can include local cache memory for temporary storage of one or more data objects and one or more sets of encoded data slices. The user device can be implemented by utilizing computing device 12 or 16 of FIG. 1 and/or another device associated with a requesting entity that communicates elements of the dispersed storage network. While not depicted in FIG. 9, the user device 910, DS processing module 920, alternate DS processing module 930, and/or the DS unit set 940 can communicate by transmitting and/or receive requests and responses via network 24 of FIG. 1. The system functions to determine how to service requests and access data stored in one or more of the DS unit set, the DS processing module, and the alternate DS processing module.

A first DS processing unit, such as computing device 16 and/or DS processing module 920, that receives an access request can make a determination of whether to service that request directly or to redirect to a second DS processing unit, such another computing device 16 and/or alternate DS processing module 930, that is known to already have the requested object in its local cache. To produce the best performance level, the first DS processing module can estimate how long it will take to recover the requested object (based on the object size, proximity, and latency to DS units that store its slices, and/or other similar parameters). The first DS processing unit can then determine what the expected latency will be for the client to handle a redirection (based on latency to the requestor, and the latency between the requestor and the second DS processing unit). Finally, the first DS processing unit can evaluate the latency between it and the second DS processing unit. To service the request, the first DS processing unit has three choices: service the request by accessing the object itself from the DS units, service the request by retrieving the object from the second DS processing unit, and third, redirecting the requestor to the second DS processing unit. As an example, consider a case where the requestor is in Asia, both DS processing units are in North America, and the DS units are in Europe. In this case, it may be best for the first DS processing unit to retrieve the object from the second DS processing unit. In another case, where the second processing unit is remote and the DS units are local, it may be fastest to service the request directly, and in a final case, where the second processing unit and requestor are local (and/or if the object is very large), it may be best to redirect the client to the second processing unit.

The user device 910 can issue a data request to the DS processing module 920 with regards to a data object. The data request can include, for example, a read, write, and/or delete request. The data request can include a data identifier of the data object and at least one of a write request, a read request, and/or a delete request. When the data object does not exist in local memory of the DS processing module, the DS processing module can select a data access approach where the data access approach includes one of accessing the DS unit set 940, redirecting to the alternate DS processing module 930, and/or directing the user device to access the alternate DS processing module 930 directly. The selecting can include estimating a performance level of each of the data access approaches and selecting the one of the data access approaches based on a comparison of estimated performance levels of each of the data access approaches. For example, the DS processing module can select to redirect to the alternate DS processing module when the data object is stored in the memory of the alternate DS processing module and is not stored in the memory of the DS processing module.

When the selected data access approach includes the accessing the DS unit set 940 directly, the DS processing module can issue one or more sets of slice access requests to the DS unit set, receive slice access responses from the DS unit set, decode the encoded data slices of the received slice access responses using a dispersed storage error coding function to recover the data object, and issue a data response to the user device that includes the recovered data object. When the selected data access approach includes the redirecting to the alternate DS processing module 930, the DS processing module can issue a redirect request to the alternate DS processing module that includes the data access request. The alternate DS processing module can obtain the data object from one of the local memory of the alternate DS processing module, and/or by retrieving encoded and decoding data slices from the DS unit set. The alternate DS processing module can output the data object to the user device by one of issuing a redirect response to the DS processing module that includes the data object and issuing an alternate data response to the user device that includes the data object. When the redirect response is issued to the DS processing module 920, the DS processing module can issue the data response to the user device that includes the data object.

When the selected data access approach includes the directing user device to access the alternate DS processing module 930 directly, the DS processing module 920 can issue a data response to the user device 910 that includes direction information, such as identifying information of the alternate DS processing module. The direction information can include one or more of identity of the alternate DS processing module and an indicator to access the alternate DS processing module directly. The user device can issue an alternate data access request to the alternate DS processing module 930 based on the direction information. The alternate DS processing module can obtain the data object, for example, from local cache memory or by retrieving the slices from the set of DS units. The alternate DS processing module can then issue an alternate data access response to the user device that includes the data object.

In various embodiments, the DS processing module 920 and the alternate DS processing module 930 can behave interchangeably. For example, in addition to responding to redirect requests or alternate data requests, the alternate DS processing module 930 perform some or all functions of the DS processing module 920, and can receive its own data requests from the same or a different requesting entity for data objects, can determine the estimated performance levels, and can select its own data access approach. The data access approach selected by the alternate DS processing module 930 can include utilizing the DS processing module 920 as its own alternate DS processing module, for example, where the alternate DS processing module can redirect requests to the DS processing module 920 or send direction information that indicates DS processing module 920 to the requesting entity. Thus, in such embodiments, the DS processing module 920 can similarly perform some or all functions of the alternate DS processing module 930 and can issue an alternate data responses to the requesting entity in response to receiving the alternate data access requests from the alternate DS processing module and/or can obtain data objects from its own local memory or the set of DS units in response to receiving a redirect request for issue via a redirect response back to the alternate DS processing module or an alternate data response to the requesting entity.

In various embodiments, a processing system of a dispersed storage (DS) processing module includes at least one processor and a memory that stores operational instructions, that when executed by the at least one processor cause the processing system to receive a data request for a data object from a requesting entity. An estimated performance level is determined for each of a set of data access approaches. One data access approach is selected from the set of data access approaches based on the estimated performance levels. The selected one data access approach is directing the requesting entity to access an alternate DS processing module directly, accessing a set of DS units directly, or redirecting the data request to the alternate DS processing module. A first data response that includes direction information is issued to the requesting entity when the selected one data access approach is the directing the requesting entity to access the alternate DS processing module directly. The requesting entity issues an alternate data access request to the alternate DS processing module based on the direction information, and the alternate DS processing module issues a first alternate data response to the requesting entity that includes the data object in response to receiving the alternate data access request. The data object is recovered from the set of DS units and a second data response is issued to the requesting entity that includes the data object when the selected one data access approach is the accessing the set of DS units directly. A redirect request is issued to the alternate DS processing module when the selected one data access approach is the redirecting the data request to the alternate DS processing module. In response to receiving the redirect request, the data object is obtained by the alternate DS processing from a local memory of the alternate DS processing module or the set of DS units. The alternate DS processing module issues the data object via a redirect response to the DS processing module or a second alternate data response to the requesting entity. A third data response is issued to the requesting entity that includes the data object when the selected one data access approach is the redirecting the data request to the alternate DS processing module and when the alternate DS processing module issues the data object via the redirect response.

In various embodiments, the data request includes one or more of a read request indicator, a data object identifier, or a requesting entity identifier. In various embodiments, determining an estimated performance level is based on at least one of: of initiating a query, performing a test, calculating estimated performance levels, or receiving an error message. In various embodiments, the selected one data access approach corresponds to an estimated performance level associated with a lowest latency.

In various embodiments, the direction information includes an identifier corresponding to the alternate DS processing module. In various embodiments, in response to the alternate data access request, the alternate DS processing module obtains the data object from a local memory of the alternate DS processing module. In various embodiments, recovering the data object from set of DS units includes issuing a set of slice access requests to the set of DS units, receiving slice access responses, and decoding a plurality of slices included in the slice access responses. In various embodiments, the redirect request includes the data request.

In various embodiments, the alternate DS processing module obtains the data object from the set of DS units set in response to determining that the data object is not stored in the local memory of the alternate DS processing module. In various embodiments, the alternate DS processing module selects to issue the data object via the one of: the redirect response to the DS processing module or the second alternate data response based on the estimated performance levels.

Figure 10:
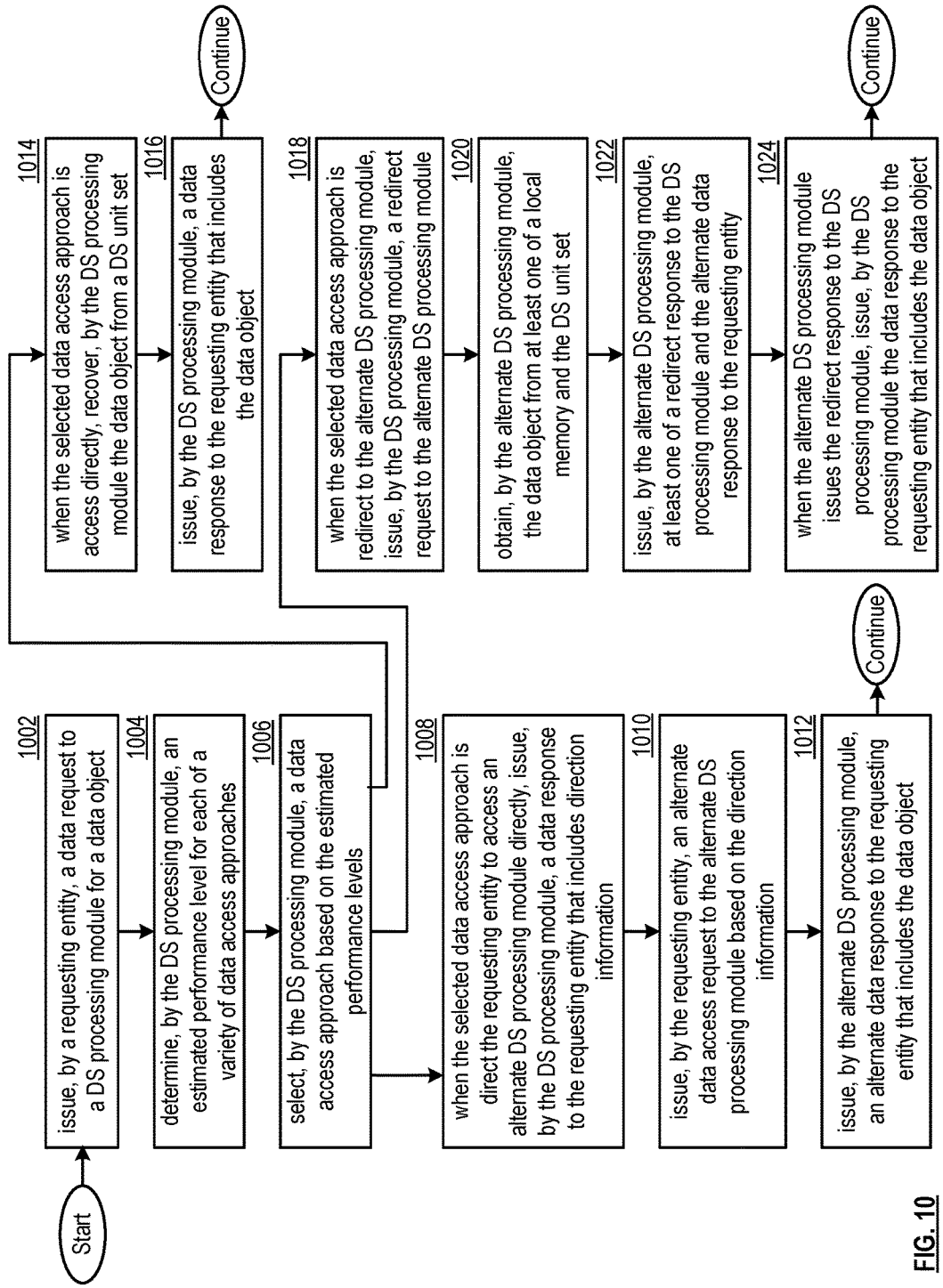
FIG. 10 is a logic diagram of an example of a method of determining how to service requests in accordance with the present invention.

FIG. 10 is a flowchart illustrating an example of determining how to service requests. The method begins at step 1002, where requesting entity (e.g., a user device) issues a data request to a dispersed storage (DS) processing module for a data object. The data request includes one or more of a read request indicator, a data object identifier, and a requesting entity identifier. The method continues at step 1004, where the DS processing module determines an estimated performance level for each of a variety of data access approaches, such as a fixed set of data access approach options. The determining can be based on one or more of initiating a query, performing a test, calculating estimated performance levels, and/or receiving an error message. The method continues at step 1006, where the DS processing module selects a data access approach of the variety of data access approaches based on the estimated performance levels. In some embodiments, the DS processing module can select a data access approach associated with a most favorable estimated performance level compared to estimated performance levels of other data access approaches. For example, the performance level can be based on latency, and the DS processing module can select the data access approach with a performance level associated with the lowest latency. Based on the selected data access approach, the method branches to step 1008, step 1014, or step 1018, corresponding to the DS processing module selecting to direct the requesting entity to access an alternate DS processing module directly, to access directly from the DS unit set, or to redirect the request to the alternate DS processing module, respectively.

When the selected data access approach is direct the requesting entity to access an alternate DS processing module directly, the method continues at step 1008, where the DS processing module issues a data response to the requesting entity that includes direction information. The direction information can include an identity information such as an identifier corresponding to the alternate DS processing module. The method continues at step 1010, where the requesting entity issues an alternate data access request to the alternate DS processing module based on the direction information. The method continues at step 1012 where the alternate DS processing module issues an alternate data response to the requesting entity that includes the data object. The issuing includes obtaining a data object from a local memory of the alternate DS processing module, and/or recovering the data object by retrieving encoded data slices from a DS unit set (e.g., request, receive, and decode slices).

When the selected data access approach is to access the DS unit set directly, the method continues at step 1014, where the DS processing module recovers the data object from the DS unit set. Recovering the data object from the DS unit set can include issuing a set of slice access requests to the DS unit set, receiving slice access responses, and decoding the slices included in the slice access responses. The method continues at step 1016, where the DS processing module issues a data response to the requesting entity that includes the data object.

When the selected data access approach is to redirect to the alternate DS processing module, the method continues at step 1018, where DS processing module issues a redirect request to the alternate DS processing module. The redirect request can include the data access request. The method continues at step 1020, where the alternate DS processing module obtains the data object from local memory of the alternate DS processing module or the DS unit set. For example, the alternate DS processing module can determine that the data object is not stored in its local cache memory, and then retrieve the encoded data slices from the DS unit set. The method continues at step 1022, where the alternate DS processing module issues a redirect response to the DS processing module and/or the alternate data response to the requesting entity, where the data object is included in the redirect response and the alternate data response. The alternate DS processing module can select whether to send the data object to the DS processing module or the requesting entity based on the estimated performance levels, a predetermination, a request, and/or a security requirement. When the alternate DS processing module issues the redirect response to the DS processing module, the method continues at the step 1024, where the DS processing module issues the data response to the requesting entity that includes the data object from the redirect response.

Figure 11:
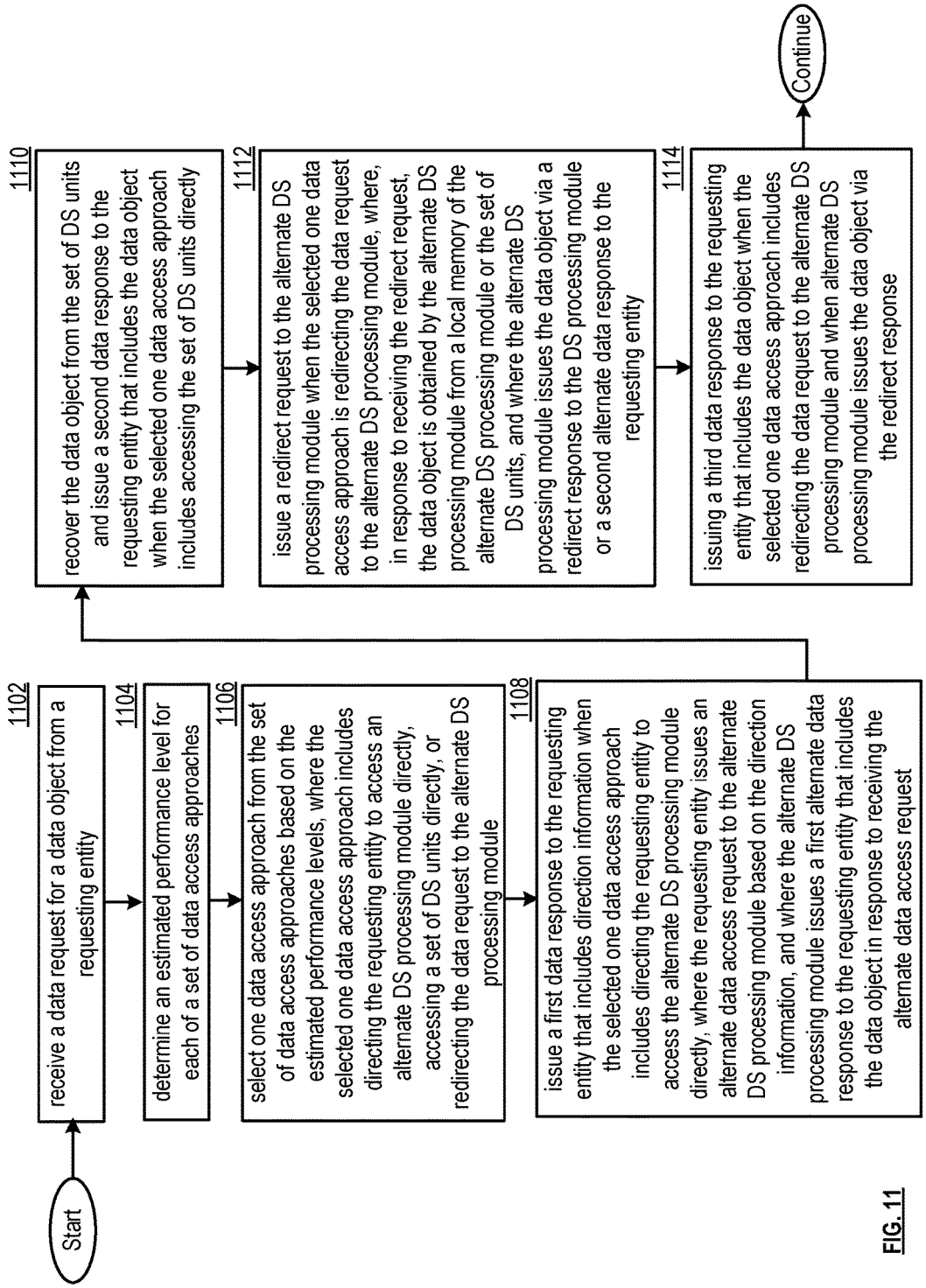
FIG. 11 is a logic diagram of an example of a method of determining how to service requests in accordance with the present invention.

FIG. 11 is a flowchart illustrating a method for determining how to service requests for use in association with one or more functions and features described in conjunction with FIGS. 1-9, for execution by a dispersed storage (DS) processing module that includes a processor or via another processing system of a dispersed storage network that includes at least one processor and memory that stores instruction that configure the processor or processors to perform the steps described below. For example, steps of method of FIG. 11 can be executed by DS processing module 920 and/or alternate DS processing module 930. Step 1102 includes receiving a data request for a data object from a requesting entity. Step 1104 includes determining an estimated performance level for each of a set of data access approaches. Step 1106 includes selecting one data access approach from the set of data access approaches based on the estimated performance levels, where the selected one data access approach includes directing the requesting entity to access an alternate DS processing module directly, accessing a set of DS units directly, or redirecting the data request to the alternate DS processing module.

Step 1108 includes issuing a first data response to the requesting entity that includes direction information when the selected one data access approach includes directing the requesting entity to access the alternate DS processing module directly, where the requesting entity issues an alternate data access request to the alternate DS processing module based on the direction information, and where the alternate DS processing module issues a first alternate data response to the requesting entity that includes the data object in response to receiving the alternate data access request. Step 1110 includes recovering the data object from the set of DS units and issuing a second data response to the requesting entity that includes the data object when the selected one data access approach includes accessing the set of DS units directly. Step 1112 includes issuing a redirect request to the alternate DS processing module when the selected one data access approach includes redirecting the data request to the alternate DS processing module, where, in response to receiving the redirect request, the data object is obtained by the alternate DS processing module from a local memory of the alternate DS processing module or the set of DS units, and where the alternate DS processing module issues the data object via a redirect response to the DS processing module or a second alternate data response to the requesting entity. Step 1114 includes issuing a third data response to the requesting entity that includes the data object when the selected one data access approach is redirecting the data request to the alternate DS processing module and when alternate DS processing module issues the data object via the redirect response.

In various embodiments, a non-transitory computer readable storage medium includes at least one memory section that stores operational instructions that, when executed by a processing system of a dispersed storage network (DSN) that includes a processor and a memory, causes the processing system to receive a data request for a data object from a requesting entity. An estimated performance level is determined for each of a set of data access approaches. One data access approach is selected from the set of data access approaches based on the estimated performance levels. The selected one data access approach is directing the requesting entity to access an alternate DS processing module directly, accessing a set of DS units directly, or redirecting the data request to the alternate DS processing module. A first data response that includes direction information is issued to the requesting entity when the selected one data access approach is the directing the requesting entity to access the alternate DS processing module directly. The requesting entity issues an alternate data access request to the alternate DS processing module based on the direction information, and the alternate DS processing module issues a first alternate data response to the requesting entity that includes the data object in response to receiving the alternate data access request. The data object is recovered from the set of DS units and a second data response is issued to the requesting entity that includes the data object when the selected one data access approach is the accessing the set of DS units directly. A redirect request is issued to the alternate DS processing module when the selected one data access approach is the redirecting the data request to the alternate DS processing module. The data object is obtained by the alternate DS processing module in response to receiving the redirect request a local memory of the alternate DS processing module or the set of DS units. The alternate DS processing module issues the data object via a redirect response to the DS processing module or a second alternate data response to the requesting entity. A third data response is issued to the requesting entity that includes the data object when the selected one data access approach is the redirecting the data request to the alternate DS processing module and when the alternate DS processing module issues the data object via the redirect response.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage (DS) processing module that includes a processor, the method comprises:
receiving a data request for a data object from a requesting entity;
determining an estimated performance level for each of a set of data access approaches;
selecting one data access approach from the set of data access approaches based on the estimated performance levels, wherein the selected one data access approach includes one of: directing the requesting entity to access an alternate DS processing module directly, accessing a set of DS units directly, or redirecting the data request to the alternate DS processing module;
issuing a first data response to the requesting entity that includes direction information when the selected one data access approach includes the directing the requesting entity to access the alternate DS processing module directly, wherein the requesting entity issues an alternate data access request to the alternate DS processing module based on the direction information, and wherein the alternate DS processing module issues a first alternate data response to the requesting entity that includes the data object in response to receiving the alternate data access request;
recovering the data object from the set of DS units and issuing a second data response to the requesting entity that includes the data object when the selected one data access approach includes the accessing the set of DS units directly, wherein recovering the data object from the set of DS units includes issuing a set of slice access requests to the set of DS units, receiving slice access responses, and decoding a plurality of slices included in the slice access responses;
issuing a redirect request to the alternate DS processing module when the selected one data access approach includes the redirecting the data request to the alternate DS processing module, wherein, in response to receiving the redirect request, the data object is obtained by the alternate DS processing module from one of: a local memory of the alternate DS processing module or the set of DS units, and wherein the alternate DS processing module issues the data object via one of: a redirect response to the DS processing module or a second alternate data response to the requesting entity; and
issuing a third data response to the requesting entity that includes the data object when the selected one data access approach is the redirecting the data request to the alternate DS processing module and when the alternate DS processing module issues the data object via the redirect response.

2. The method of claim 1, wherein the data request includes one or more of a read request indicator, a data object identifier, or a requesting entity identifier.

3. The method of claim 1, wherein determining an estimated performance level is based on at least one of: of initiating a query, performing a test, calculating estimated performance levels, or receiving an error message.

4. The method of claim 1, wherein the selected one data access approach corresponds to an estimated performance level associated with a lowest latency.

5. The method of claim 1, wherein the direction information includes an identifier corresponding to the alternate DS processing module.

6. The method of claim 1, wherein, in response to the alternate data access request, the alternate DS processing module obtains the data object from a local memory of the alternate DS processing module.

7. The method of claim 1, wherein the redirect request includes the data request.

8. The method of claim 1, wherein the alternate DS processing module obtains the data object from the set of DS units set in response to determining that the data object is not stored in the local memory of the alternate DS processing module.

9. The method of claim 1, wherein the alternate DS processing module selects to issue the data object via the one of: the redirect response to the DS processing module or the second alternate data response based on the estimated performance levels.

10. A processing system of a dispersed storage (DS) processing module comprises:
   at least one processor;
   a memory that stores operational instructions, that when executed by the at least one processor cause the processing system to:
      receive a data request for a data object from a requesting entity;
      determine an estimated performance level for each of a set of data access approaches;
      select one data access approach from the set of data access approaches based on the estimated performance levels, wherein the selected one data access approach includes one of: directing the requesting entity to access an alternate DS processing module directly, accessing a set of DS units directly, or redirecting the data request to the alternate DS processing module;
      issue a first data response to the requesting entity that includes direction information when the selected one data access approach includes the directing the requesting entity to access the alternate DS processing module directly, wherein the requesting entity issues an alternate data access request to the alternate DS processing module based on the direction information, and wherein the alternate DS processing module issues a first alternate data response to the requesting entity that includes the data object in response to receiving the alternate data access request;
      recover the data object from the set of DS units and issue a second data response to the requesting entity that includes the data object when the selected one data access approach includes the accessing the set of DS units directly, wherein recovering the data object from the set of DS units includes issuing a set of slice access requests to the set of DS units, receiving slice access responses, and decoding a plurality of slices included in the slice access responses;
      issue a redirect request to the alternate DS processing module when the selected one data access approach includes the redirecting the data request to the alternate DS processing module, wherein, in response to receiving the redirect request, the data object is obtained by the alternate DS processing module from one of: a local memory of the alternate DS processing module or the set of DS units, and wherein the alternate DS processing module issues the data object via one of: a redirect response to the DS processing module or a second alternate data response to the requesting entity; and
      issue a third data response to the requesting entity that includes the data object when the selected one data access approach is the redirecting the data request to the alternate DS processing module and when the alternate DS processing module issues the data object via the redirect response.

11. The processing system of claim 10, wherein determining an estimated performance level is based on at least one of: of initiating a query, performing a test, calculating estimated performance levels, or receiving an error message.

12. The processing system of claim 10, wherein the selected one data access approach corresponds to an estimated performance level associated with a lowest latency.

13. The processing system of claim 10, wherein the direction information includes an identifier corresponding to the alternate DS processing module.

14. The processing system of claim 10, wherein, in response to the alternate data access request, the alternate DS processing module obtains the data object from a local memory of the alternate DS processing module.

15. The processing system of claim 10, wherein the redirect request includes the data request.

16. The processing system of claim 10, wherein the alternate DS processing module obtains the data object from the set of DS units in response to determining that the data object is not stored in the local memory of the alternate DS processing module.

17. The processing system of claim 10, wherein the alternate DS processing module selects to issue the data object via the one of: the redirect response to the DS processing module or the second alternate data response based on the estimated performance levels.

18. A non-transitory computer readable storage medium comprises:
   at least one memory section that stores operational instructions that, when executed by a processing system of a dispersed storage network (DSN) that includes a processor and a memory, causes the processing system to:
      receive a data request for a data object from a requesting entity;
      determine an estimated performance level for each of a set of data access approaches;
      select one data access approach from the set of data access approaches based on the estimated performance levels, wherein the selected one data access approach includes one of: directing the requesting entity to access an alternate DS processing module directly, accessing a set of DS units directly, or redirecting the data request to the alternate DS processing module;
      issue a first data response to the requesting entity that includes direction information when the selected one data access approach includes the directing the requesting entity to access the alternate DS processing module directly, wherein the requesting entity issues an alternate data access request to the alternate DS processing module based on the direction information, and wherein the alternate DS processing module issues a first alternate data response to the requesting entity that includes the data object in response to receiving the alternate data access request;
      recover the data object from the set of DS units and issue a second data response to the requesting entity that includes the data object when the selected one data access approach includes the accessing the set of DS units directly, wherein recovering the data object from the set of DS units includes issuing a set of slice access requests to the set of DS units, receiving slice access responses, and decoding a plurality of slices included in the slice access responses;
      issue a redirect request to the alternate DS processing module when the selected one data access approach includes the redirecting the data request to the alternate DS processing module, wherein, in response to receiving the redirect request, the data object is obtained by the alternate DS processing module from one of: a local memory of the alternate DS processing module or the set of DS units, and wherein the alternate DS processing module issues the data object via one of: a redirect response or a second alternate data response to the requesting entity; and issue a third data response to the requesting entity that includes the data object when the selected one data access approach is the redirecting the data request to the alternate DS processing module and when the alternate DS processing module issues the data object via the redirect response.

* * * * *